United States Patent
Maas et al.

(10) Patent No.: US 8,588,411 B2
(45) Date of Patent: Nov. 19, 2013

(54) METHOD FOR SECURE COMMUNICATION IN A NETWORK, A COMMUNICATION DEVICE, A NETWORK AND A COMPUTER PROGRAM THEREFOR

(75) Inventors: Martijn Maas, Eindhoven (NL); Oscar Garcia Morchon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 212 days.

(21) Appl. No.: 13/063,550

(22) PCT Filed: Sep. 9, 2009

(86) PCT No.: PCT/IB2009/053930
§ 371 (c)(1),
(2), (4) Date: Mar. 11, 2011

(87) PCT Pub. No.: WO2010/032161
PCT Pub. Date: Mar. 25, 2010

(65) Prior Publication Data
US 2011/0167273 A1    Jul. 7, 2011

(30) Foreign Application Priority Data

Sep. 19, 2008   (EP) .................................. 083055699

(51) Int. Cl.
*H04L 9/12*    (2006.01)
(52) U.S. Cl.
USPC ............................................ 380/45; 713/171
(58) Field of Classification Search
None
See application file for complete search history.

(56) References Cited

U.S. PATENT DOCUMENTS

2009/0167535 A1*   7/2009   Sanchez et al. ............ 340/573.1

FOREIGN PATENT DOCUMENTS

WO    2007149850 A2    12/2007

OTHER PUBLICATIONS

Sanchez, D.: "Key Management for Wireless AD HOC Networks"; Von Der Fakultat Fur Mathematik Naturwissenschaften und Informatik Der Brandenburgischen Technischen Universitat Cottbus, Genehmigte Dissertation, Retrieved Online at http://deposit.d-nb.de/cgi-bin/dokserv?idn=98285157x&dok_var=dl&dok_ext=pdf&filename=98285157x.pdf>06, on 1009-11-06,118 Page Document.

* cited by examiner

*Primary Examiner* — Gilberto Barron, Jr.
*Assistant Examiner* — Izunna Okeke (57) ABSTRACT

The present invention relates to a method for secure communications and communication networks having communication devices, using secure means like encryption system for securing communications. More particularly, the present invention relates to a method for secure communications from a first node (N1) to a second node (N2) in a network, the first node comprising a first node keying material ($KM^{(ID1)}$), the second node comprising a second node keying material ($KM^{(ID2)}$), wherein the keying materials of the first node and of the second node comprise each a plurality of keying root shares formed by keying root share segments. The method using key segmentation for pre-distributing keying material according to a variable distribution for increasing the resiliency of existing methods.

15 Claims, 4 Drawing Sheets

METHOD FOR SECURE COMMUNICATION IN A NETWORK, A COMMUNICATION DEVICE, A NETWORK AND A COMPUTER PROGRAM THEREFOR

FIELD OF THE INVENTION

The present invention relates to method for secure communications and communication networks having communication devices, using secure means like encryption system for securing communications. This invention finds an advantageous application in mobile wireless sensor and actuator networks (WSNs), and more particularly in medical wireless networks for patient monitoring.

BACKGROUND OF THE INVENTION

Due to these sensitive applications, networks of the like must be provided with security services like confidentiality, authentication, integrity, and authorization.

Encryption systems used in conventional communication networks typically carry out encryption methods based on cryptography for securing the communications.

More particularly, in some networks comprising nodes having to be very cost-efficient, symmetric cryptography is therefore usually applied to enable required security services. Indeed, in networks of the like, such as wireless sensor networks, nodes are typically resource-constrained, namely in terms of battery power, communication bandwidth, processing power, or memory. Security methods based on asymmetric cryptography are thus generally considered either inefficient or infeasible in such nodes.

The fundamental issue in symmetric cryptography lies in key-distribution, i.e. in the establishment of shared secrets in nodes belonging to a network and having to communicate securely. This problem is particularly eminent in WSNs, since their size can vary from tens to several tens of thousands of nodes, and their nature can be very dynamic, e.g. the network topology may not be known a priori.

Conventional key pre-distribution methods used in WSN are combinatorial methods, which consist in splitting nodes of a network into classes, and in assigning to each node a set of keys corresponding to its class. A class within the meaning of the present description corresponds to a set of elements gathered in accordance with a predetermined law such as a mathematical, arithmetical, or logical law. In such methods, nodes in a same class all share the same keys, and nodes from different classes are guaranteed to share at least one key, so as to enable communication.

However, those methods present a major drawback in terms of resiliency, since the capture of a node by an adversary implies that all the keys in the captured node key set are compromised and, consequently, communication of all nodes in that class, and even nodes in other classes using the same keys, is compromised.

In addition, some WSN application scenarios such as patient monitoring in hospitals require different security domains organized in a hierarchical manner. In such networks, sensor nodes belong to one or several security domains, depending on their level of authorization. In existing hierarchical key distribution schemes, each security domain is linked to a key distribution, thus the capture of a security domain at a low level, i.e. a security domain comprising many nodes, even if not leading to compromise the keying material of other security domains at low levels, can still break the security at higher levels.

SUMMARY OF THE INVENTION

It is an object of the invention to propose a method using a key distribution concept in order to overcome the drawbacks previously presented.

It is another object of the invention to propose a method offering a better resiliency to attacks. Still another object of the invention is to provide a method for secure communications in an efficient way.

To this end, a method for secure communications from a first node to a second node in a network is proposed, the first node comprising a first node keying material, the second node comprising a second node keying material, wherein the keying materials of the first node and of the second node comprise each a plurality of keying root shares formed by keying root share segments.

Such a method comprises the following steps:
a step a) of determining an identifier of the second node;
a step b) of determining the composition of the keying material of the second node, the keying material comprising a plurality of keying root shares formed by keying root share segments, this determination comprising the selection of each $i^{th}$ keying root share segment of the keying material from a predistributed keying material set, such set depending at least on i and on the second node's identifier;
a step c) of comparing the first node keying material and the second node keying material, for identifying the common keying root share segments, wherein an $i^{th}$ common keying root share segment is determined by retrieving the keying root share segment in common between a set comprising all $i^{th}$ keying root share segments of the second node keying material and a set comprising all $i^{th}$ keying root share segments of the first node keying material, and
a step d) of computing a shared key between the first node and the second node, based on at least one of the identified common keying root share segments, the identifier of the second node, and the segment identifier i.

In the following specification, two nodes m and n will be said as belonging to the same class for a key segment i when the predistributed keying material set depending on i and m is the same as the predistributed keying material set depending on i and n.

A method according to the invention allows key segment diversification since two nodes belonging to a same class for key element i are likely to belong to different classes for the other keying root share segments.

As a consequence, the size of the groups of nodes sharing exactly the same root segments is highly decreased as compared with conventional methods. Accordingly, capturing a limited number of nodes belonging to the same class for one key segment would compromise only that particular segment of the corresponding keys rather than the whole key, thus increasing the resiliency of this method.

In one embodiment, step d) comprises the step of computing key segments from the identified keying roots share segments and from both identifiers of the first node and second node, and the step of generating the shared key either by concatenating or combining the computed key segments.

Concatenating the key segments to generate the shared key allows increasing the computational efficiency of the method, since the bit length of the key segments is smaller than the bit length of the shared key, which means that there is no storage or computation overhead. This is of particular importance for WSNs where computation power in the nodes is limited.

Apart from concatenation, one of the possible combination methods lies in logically combining the segments using an XOR operator. In such a case, the bit length of the key segments is the same as the bit length of the eventual key, which is advantageous in that the compromise of any number of segments less than the size of the key does not decrease the strength of the key.

In one embodiment, the predistributed keying material set used for determining the keying material of a node corresponds to a set of elements of one or several finite projective planes, distributed according to a variable distribution of the nodes in the network, indexed by a variable parameter of the distribution, and depending on i and on an identifier of the node whose keying material is being determined.

Using a variable parameter for the distribution helps increasing the resiliency of the method, since it allows adding another source of variation in the computation of the shared key.

Moreover, in an advantageous embodiment, the variation law of the variable parameter is initially kept secret, and the method thus comprises a step, for the node, of receiving values of the variable parameter from a centralized or distributed network authority comprising one or several nodes.

This receiving step may be performed as follows: the first node sends a request to the network authority, who decides whether the first node is allowed to generate shared key and, upon positive result, eventually sends, preferably in a secure way, the values of the variable parameter to the first node.

Keeping the variation law of the variable parameter secret means that, during a pre-deployment phase, i.e. before the nodes actually join a specific network, a node is not provided with the values of the parameter used for the variable distribution, and two major advantages are reached in this way:
first, an access control is performed, since the nodes first have to report to the network authority of the network they have joined, who controls whether a node is allowed, or not, to generate a key, and
the resiliency is increased due to the fact that if a node is captured before having been deployed, i.e. before having joined a network, the attacker would be able to retrieve the keying material in the node, but not the keying roots who depend on the secret variable parameter.

The present invention also relates to a communication device designed for being included in a network as a first node, comprising:
storage means for storing a keying material of the first node, the keying material of the first node comprising a plurality of keying root shares formed by keying root share segments,
means for determining an identifier of a second node of the network,
a controller arranged for determining the composition of the keying material of the second node, the keying material comprising a plurality of keying root shares formed by keying root share segments,
the controller comprising a selector for selecting each $i^{th}$ keying root share segment of the keying material from a predistributed keying material set, such set depending at least on i and on the second node's identifier,
the controller further comprising comparison means for comparing the first node keying material and the second node keying material, for identifying the index common keying root share segments,
comparison means comprising retrieving means for determining an $i^{th}$ common keying root share segment by retrieving the keying root share segment in common between a set comprising the $i^{th}$ keying root share segment for each keying root share of the second node keying material and a set comprising the $i^{th}$ keying root share segment of each keying root share of a predetermined first node keying material,
the controller further comprising computation means for computing a shared key between the first node and the second node, based on at least one of the identified common keying root share segments, the identifier of the second node and the segment identifier i.

The present invention also relates to a network comprising at least two communication devices as described above, wherein one communication device represents a first node of the network, and another communication device represents a second node of the network, and wherein the first node and the second node communicate one with each other by using the shared key, so as to secure the communication.

In accordance to another aspect of the invention, a computer program is provided for implementing a method according to the invention.

The invention also finds an advantageous application in some networks comprising different security domains distributed in a hierarchical manner. In such networks, each security domain is generally linked to different and independent cryptographic information, and the distribution of keying material when deploying the network is made in such a way as to ensure full security interoperability between nodes as well as distributed access control and hierarchical node identification. Thus, in one embodiment, a method according to the invention is such that, in the case of a network comprising several security domains hierarchically distributed, the determination of keying material of the nodes is carried out in such a way that the correlation of keying material shares in different nodes and the amount of compromised keying roots under attack is minimized.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for secure communications from a first node to a second node in a network. The present invention is more especially dedicated to wireless sensor and actuator networks used for patient monitoring, e.g. networks comprising sensor nodes for sensing physical parameters of a patient, receptor nodes for providing medical staff with the parameters, and actuator nodes.

However, it is to be noted that the present invention is not limited to networks of the like, and can be carried out in any type of network, used for any technical application.

Figure 1:
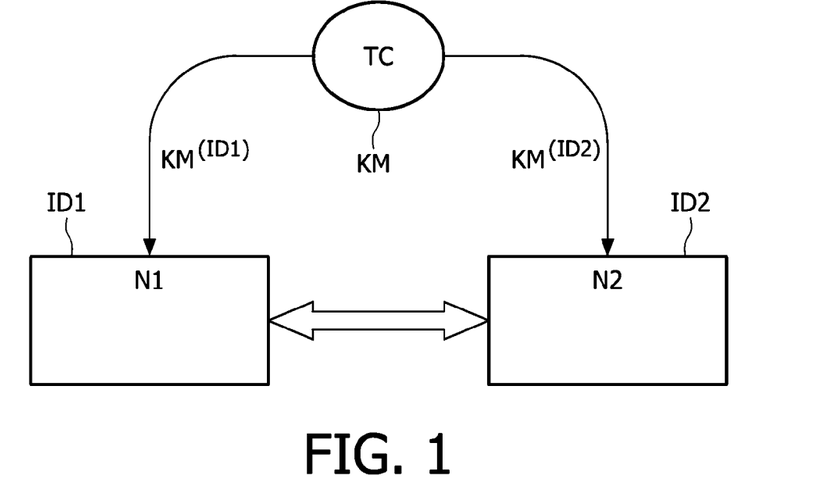
FIG. 1 represents a network according to one embodiment of the invention.
Figure 2:
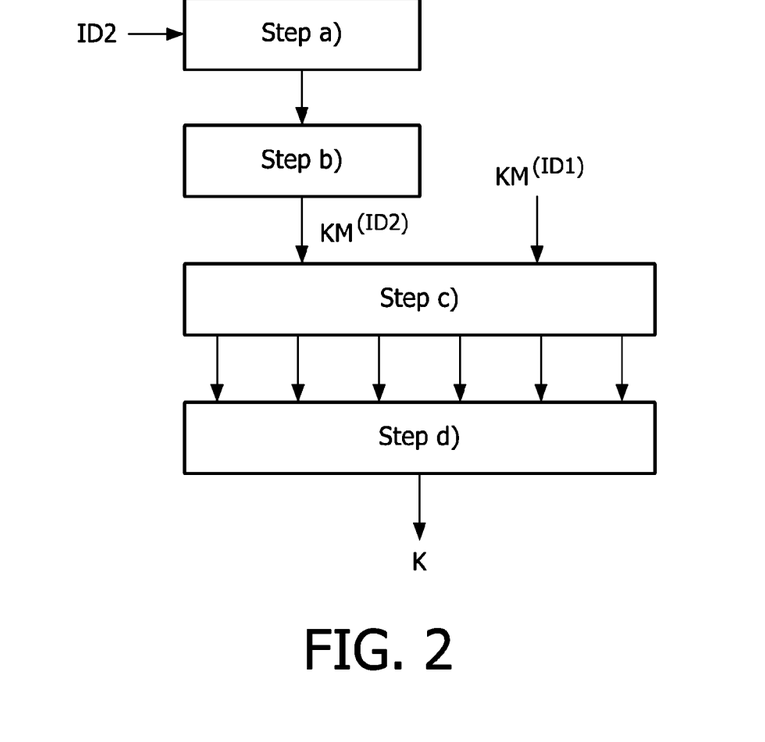
FIG. 2 is a block diagram of a method for secure communications from a first node to a second node, according to an embodiment of the invention.

A method according to one embodiment of the invention will now be described in connection with FIGS. 1 and 2.

A network according to the invention comprises at least two nodes N1 and N2, each one being provided with an identifier, respectively ID1 and ID2. In an embodiment, the network also comprises a trust center node TC, used for the configuration of the network and for providing the nodes N1 and N2 with all necessary keying material information for generating cryptographic keys. This trust centre node TC represents one possible embodiment of a network authority previously mentioned.

During operational phase, to ensure the communication between the first node N1 and the second node N2 of the network, each of the nodes generates a shared key by using the distributed keying material information and uses this key to protect any communication sent to the other node, or to decode any communication received from this other node. FIG. 2 describes the different steps required for the first node to generate a shared key for communicating with the second node. Similar steps are performed by the second node for generating the corresponding shared key for communicating with the first node.

To generate a key, a node needs to be provided with a keying material share, respectively $KM^{(ID1)}$ and $KM^{(ID2)}$ for the first node and the second node, i.e. some information allowing for key establishment. The keying material share is generally received from the trust center TC during a configuration phase of the network. The keying material shares provided to the nodes are generated from the root keying material KM, which is a crypto information only known to the trust center.

The method described above is thus not intended to be applied to a particular node, but can be carried out by any node of the network.

When a communication is to be established between the first node and the second node, the first node receives from the second node, on step a), an identifier ID2 of the second node.

In order to discover the shared key for communicating with the second node, the first node needs to determine, in step b), the composition of the keying material share of the second node.

A keying material share comprises a plurality of keying root shares and, in a method according to the invention, those keying root shares are segmented, which means that they are formed by a plurality segment. It is to be noted that all keying root shares generally comprise the same number of segments.

Accordingly, in a method according to one embodiment of the present invention, the shared key between the first node and the second node is composed of a number of key segments.

Thus, determining the composition of a keying material, in step b), corresponds to determining separately each segment of the keying root shares.

Such a determination will be further detailed in connection with FIG. 3.

In one embodiment of a method according to the invention, the keying root shares are key elements, divided into segments. Accordingly, determining the different segments of the keying root shares correspond to determining ready-made key segments further combined for generating the eventual shared key between the first node and the second node.

However, in an advantageous embodiment, a method according to the invention is combined with a λ-resilient method that relies on the fact that nodes do not share ready-made keys. Instead, nodes are provided with node-specific information that allows them to compute a shared key with another node on input of that node's identifier. This node specific information, called a keying root share, is derived from a keying root. As an example, a keying root share is a polynomial of degree λ, thus a polynomial having λ+1 coefficients.

After having determined the composition of the second node keying material $KM^{(ID2)}$, the first node compares, in step c), this second node keying material $KM^{(ID2)}$ with its own keying material $KM^{(ID1)}$. This comparison can also be performed based on the keying material identifiers.

As said before, in one embodiment, each node is provided with its own keying material share during the configuration phase. However, in another embodiment, the first node determines its own keying material share during operational phase, using a method similar to the one that will be further described, based on FIG. 3. Moreover, in one embodiment, the determination of the node keying material is carried out in such a way as to minimize the correlation of the different keying material segments.

The comparison of the first node keying material $KM^{(ID1)}$ with the second node keying material $KM^{(ID2)}$ is performed as follows: for each segment, the first node finds out which keying root segment they have in common, which means that, for each segment i comprised between 1 and the number of segments, the first node finds out the common element between a set comprising the $i^{th}$ segment of each keying root share of the first node keying material and a set comprising the $i^{th}$ segment of each keying root share of the second node keying material.

After having identified the common segments, the first node computes, in step d), the shared key K with the second node.

This composition may be performed in several ways, according to several embodiments of the invention.

For example, the key segments $k_i$ may be simply concatenated in order to get the eventual key K: $K=k_1\|k_2\|\ldots\|k_t$. In this case where the number of key segments used for composing the key K is t, the bit length of the key segments is a factor t smaller than the bit length of the eventual key K, so there is no storage or computation overhead. Such a composition makes it possible to increase computation efficiency of the method.

Another option is to compose K by mathematical, arithmetical or logical combinations of the different key segments, for example by XOR-ing the different key segments: $K=k_1 \oplus k_2 \oplus \ldots \oplus k_t$.

For this composition, the bit length of the key segments should equal the required bit length of K. The XOR composition is advantageous in that, in case of an attack, compromising any number of key segments less than t does not decrease the strength of the key.

There may be other methods for key composition, like methods applying a hash function to get an output of desired bit length and to remove possible algebraic relations between keys.

In case a λ-resilient method is used, computation comprises the step, before the combination step, of determining the common key segments by evaluating the common keying root keying root share segments on input of the second node's identifier.

Figure 3:
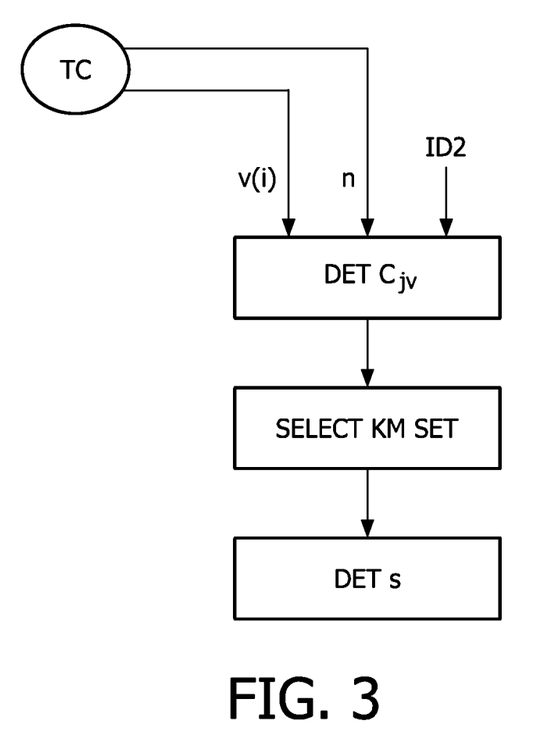
FIG. 3 is a detailed block diagram of one step of the method shown on FIG. 1.

We will now describe, in connection with FIG. 3, the determination of a specific keying root share segment i of the first node.

First of all, we will describe some general concepts carried out while performing such a determination, those concepts being used in some, but not necessarily all, embodiments of the invention.

As explained before, keying root share segments are selected among a predistributed keying material set, depending at least on the first node identifier, and on i.

In the embodiment herein described, a method according to the invention carries out a combinatorial key pre-distribution method for predistributing the keying material sets.

Typically, the combinatorial concept herein used is a Finite Projective Plane, called FPP, an thus the predistributed keying material set used for the determination of a node keying material corresponds to a set of elements of a FPP.

An FPP of order n and parameters ($n^2+n+1$, $n+1$, 1) is defined as an arrangement of $n^2+n+1$ distinct elements into $n^2+n+1$ blocks such that:

Each block contains exactly n+1 elements.
Every element occurs in exactly n+1 blocks.
Every pair of blocks has exactly 1 element in common.
The set of elements is denoted by $E=\{0, \ldots, n^2+n\}$ and the set of blocks by $B=\{B_0, \ldots, B_n\}$, where block $B_i=\{b_{i,0}, \ldots, b_{i,n}\} \subset E$.

As an example, an FPP of order 2, i.e. where n=2, defines the following blocks:

$B_0=(0, 2, 4)$;
$B_1=(1, 3, 4)$;
$B_2=(0, 3, 5)$;
$B_3=(1, 2, 5)$;
$B_4=(0, 1, 6)$;
$B_5=(2, 3, 6)$;
$B_6=(4, 5, 6)$;

As stated previously, one of the properties of FPP is the fact that every pair of block has exactly 1 element in common. Accordingly, when two nodes want to communicate, they can use a shared key element based on the common element of their corresponding FPP blocks to agree on a common secret and communicate in a secure manner.

In a typical clever distribution, the different blocks of an FPP correspond to different classes of nodes, j. The node identifier, ID, can be mapped to the node class according to the following relationship: $j=ID \pmod{n^2+n+1}$.

Nodes from class $C_j$ are provided with keys indexed by the elements of block $B_j$. For instance, node 8 belongs to class $C_1$ and therefore its Keying Material, denoted $K^{(8)}$, is given by the set of keys $KM^{(8)}=\{k_{b_{1,0}}, k_{b_{1,1}}, k_{b_{1,2}}\}=\{k_1, k_3, k_4\}$ If this node wants to communicate with node 14, they use the FPP properties to discover a shared key. This key is $k_4$, because this node belongs to class $C_0$ and therefore:

$KM^{(14)}=\{k_{b_{0,0}}, k_{b_{0,1}}, k_{b_{0,2}}\}=\{k_0, k_2, k_4\}$

This distribution has a period of $n^2+n+1$, which means that all nodes whose identities differ a multiple of $n^2+n+1$ are in the same class. To increase this period, and thus increase the resiliency of the method, in one embodiment a variable distribution is used for predistributing the key material.

This variable distribution is indexed by a parameter v, depending of the keying root share segment to be determined, so that
 a node belongs to different classes for different segments of the keying root shares, and
 two nodes belonging to the same class for one segment are likely to belong to different classes for another segment.

Advantageously, the variable distribution is defined as follows: node ID is assigned to class $C_{j_v}$, where:

$$j_v \equiv v \cdot \left\lfloor \frac{ID}{n^2+n+1} \right\rfloor + ID \pmod{n^2+n+1}.$$

Parameter v depends on the segment to be determined, and it appears that different values of v give different distributions of nodes. In total, there are $n^2+n+1$ different distributions for $0 \leq v \leq n^2+n$. For a particular value of v, the period of the distribution is equal to:

$$\frac{(n^2+n+1)^2}{gcd(v, n^2+n+1)}.$$

where gcd (a,b) is the great common divisor between a and b, i.e. the largest positive integer that divides both numbers without remainder.

So the period of a distribution is maximal for gcd (v, $n^2+n+1$)=1, in which case the period is $(n^2+n+1)^2$. This is always the case for $n^2+n+1$ prime and v>0.

Accordingly, the size of the groups of nodes that share exactly the same root segments is decreased by a factor $n^2+n+1$. Hence, the relative resiliency per class is increased by a factor $n^2+n+1$.

Table 1 below lists the class $C_{j_v}$ for nodes with identifiers up to ID=20 in the variable distribution for n=2.

TABLE 1

| | | Variable Distribution for n = 2 | | | | | | | | | | | | | | | | | | | | |
|---|---|---|---|---|---|---|---|---|---|---|---|---|---|---|---|---|---|---|---|---|---|---|
| | | Node identity ID | | | | | | | | | | | | | | | | | | | | |
| | | 0 | 1 | 2 | 3 | 4 | 5 | 6 | 7 | 8 | 9 | 10 | 11 | 12 | 13 | 14 | 15 | 16 | 17 | 18 | 19 | 20 |
| v = 0 | | 0 | 1 | 2 | 3 | 4 | 5 | 6 | 0 | 1 | 2 | 3 | 4 | 5 | 6 | 0 | 1 | 2 | 3 | 4 | 5 | 6 | ... |
| v = 1 | | 0 | 1 | 2 | 3 | 4 | 5 | 6 | 1 | 2 | 3 | 4 | 5 | 6 | 0 | 2 | 3 | 4 | 5 | 6 | 0 | 1 | ... |
| v = 2 | | 0 | 1 | 2 | 3 | 4 | 5 | 6 | 2 | 3 | 4 | 5 | 6 | 0 | 1 | 4 | 5 | 6 | 0 | 1 | 2 | 3 | ... |
| v = 3 | | 0 | 1 | 2 | 3 | 4 | 5 | 6 | 3 | 4 | 5 | 6 | 0 | 1 | 2 | 6 | 0 | 1 | 2 | 3 | 4 | 5 | ... |
| v = 4 | | 0 | 1 | 2 | 3 | 4 | 5 | 6 | 4 | 5 | 6 | 0 | 1 | 2 | 3 | 1 | 2 | 3 | 4 | 5 | 6 | 0 | ... |
| v = 5 | | 0 | 1 | 2 | 3 | 4 | 5 | 6 | 5 | 6 | 0 | 1 | 2 | 3 | 4 | 3 | 4 | 5 | 6 | 0 | 1 | 2 | ... |
| v = 6 | | 0 | 1 | 2 | 3 | 4 | 5 | 6 | 6 | 0 | 1 | 2 | 3 | 4 | 5 | 5 | 6 | 0 | 1 | 2 | 3 | 4 | ... |

We will now describe in detail the determination of $i^{th}$ keying root share segments belonging to the keying material of node ID. In this example, the parameter v depends on i as follows: v=i−1.

A first node, identified as ID1, already provided with its own keying material $KM^{(ID1)}$, receives a second node identifier ID2, in view of establishing communication with this second node.

The first node is also provided with information for determining v, as mentioned above, and with the order n of the FPP used for predistributing the keying material sets. Those elements are provided to the nodes by the trust center node TC, either during pre-deployment or deployment phase, or during operational phase.

In a first step (DET $C_{j_v}$), the first node determines, for segment i, the class to which the second node belongs to. As stated before, a variable distribution is used, with the following relation:

$$j_v \equiv v \cdot \left\lfloor \frac{ID}{n^2+n+1} \right\rfloor + ID \ (\bmod\, n^2+n+1)$$

where $\lfloor x \rfloor$ represents the integer part of x.

Thus, with the notations of the present description, the second node belongs to Class $C_{j_v}$ with $$j_v \equiv (i-1) \cdot \left\lfloor \frac{ID2}{n^2+n+1} \right\rfloor + ID2 \ (\bmod\, n^2+n+1).$$

The parameter $j_v$ is then used, in a second step (SELECT KM SET), to determine the predistributed keying material set in which the keying root share segments are selected.

The Keying Material set corresponding to Class $C_{j_v}$ is the block $B_{j_v}$ of a Finite projective Plane of order n.

Thereafter, in step (DET 5), the $i^{th}$ segments of the keying root shares are determined, based on the element of the block $B_{j_v}$ previously determined.

The number of elements of a block $B_{j_v}$ is n+1, which is equal to the number of keying root shares forming the keying material of a node.

Accordingly, the $i^{th}$ segment of the $l^{th}$ keying root share is determined based on the $l^{th}$ element of block $B_{j_v}$.

The method described in accordance with FIG. 3 is performed for each i, i being an integer between 1 and the number of segments forming a keying root share.

For example, let us suppose the key is composed of t segments, with $t \le n^2+n+1$. The Keying Material for node ID, consisting of n+1 KR shares that each have t segments, is constructed as follows. The first segments of the KR shares correspond to the FPP block for ID according to the distribution with v=0, which is block $B_{j_0}=\{b_{j_0,0}, \ldots, b_{j_0,n}\}$. Hence, these first segments of the KR shares are given by $$kr^{(ID)}_{b_{j_0,0},1}, kr^{(ID)}_{b_{j_0,1},1}, \ldots, kr^{(ID)}_{b_{j_0,n},1}.$$

The second KR share segments are distributed according to v=1, so they take their index from block $B_{j_1}=\{b_{j_1,0}, \ldots, b_{j_1,n}\}$. Therefore, these shares are $$kr^{(ID)}_{b_{j_1,0},2}, kr^{(ID)}_{b_{j_1,1},2}, \ldots, kr^{(ID)}_{b_{j_1,n},2}.$$

Similarly, the $l^{th}$ segments of the KR shares are distributed according to v=l−1. This results in the following construction of node ID's Keying Material:

$$KM^{(ID)} = \left\{ \left\{ kr^{(ID)}_{b_{j_0,0},1}, kr^{(ID)}_{b_{j_1,0},2}, \ldots, kr^{(ID)}_{b_{j_{t-1},0},t} \right\}, \right.$$
$$\left. \ldots, \left\{ kr^{(ID)}_{b_{j_0,n},1}, kr^{(ID)}_{b_{j_1,n},2}, \ldots, kr^{(ID)}_{b_{j_{t-1},0},t} \right\} \right\}$$

We will now fully describe a specific example for determining a shared key between two nodes, using a method according to the present invention.

This example takes the following parameters:
the nodes' identifiers are ID1=8 and ID2=14,
the order of the FPP is n=2,
the number of segment of the keying root shares is t=3, and
the dependency between the parameter v and the segment s is v=s−1.

For node 8, the first segments are distributed according to block $B_{10}$ with $j_0$=1, as can be seen from the row in Table 1 shown above with v=0 and ID=8. Hence, the first segments of the keying root shares have indices listed by $B_1$={1, 3, 4}. Similarly, the second segments correspond to $B_2$={0, 3, 5} (since $j_1$=2 for ID=8) and the third segments to $B_3$={1, 2, 5} (since $j_2$=3 for ID=8). Hence, the Keying Material for node 8 is given by:

$KM^{(8)}=\{\{kr_{1,1}^{(8)},kr_{0,2}^{(8)},kr_{1,3}^{(8)}\},\{kr_{3,1}^{(8)}, kr_{3,2}^{(8)},kr_{2,3}^{(8)}\},\{kr_{4,1}^{(8)},kr_{5,2}^{(8)},kr_{5,3}^{(8)}\}\}$

In the same way, the segments for node 14 correspond to blocks $B_0$, $B_2$, and $B_4$, respectively. Hence, node 14 is provided with Keying Material:

$KM^{(14)}=\{\{kr_{0,1}^{(14)},kr_{0,2}^{(14)},kr_{0,3}^{(14)}\}, \{kr_{2,1}^{(14)},kr_{3,2}^{(14)},kr_{1,3}^{(14)}\},\{kr_{4,1}^{(14)}, kr_{5,2}^{(14)},kr_{6,3}^{(14)}\}\}$

To compute a shared key with node 14, node 8 finds out for each segment which Keying
Root segment they have in common. This turns out to be $kr_{4,1}$ for the first segment, and $kr_{1,3}$ for the third.

In the present case, for the second segment, all the elements are common between $KM^{(8)}$ and $KM^{(14)}$.

In an embodiment of the invention, in such a case, the common segment is selected in accordance with a predetermined law known by all nodes.

Let us assume, in the present example, that the selected common element chosen for the second segment is $kr_{1,3}$.

As mentioned previously, in an advantageous embodiment, a method according to the invention is combined with a λ-resilient method, which means that the first node and the second node do not directly share ready-made keys, but share some node-specific information. Thus, in this case, the common segments do not represent directly key segments, but information used for evaluating the key segment.

Typically, the keying root share segments represent lambda-secure functions such as multivariate polynomials of degree λ. In the present case, bivariate polynomials are used, i.e. for any i and j, $kr_{m,n}^{(i)}(j)=kr_{m,n}^{(j)}(i)$.

In the specific example, node 8 evaluates each of its KR shares $kr_{4,1}^{(8)}$, $kr_{0,2}^{(8)}$, and $kr_{1,3}^{(8)}$ at ID=14 and composes the resulting t key segments into the eventual key shared between nodes 8 and 14.

Figure 4:
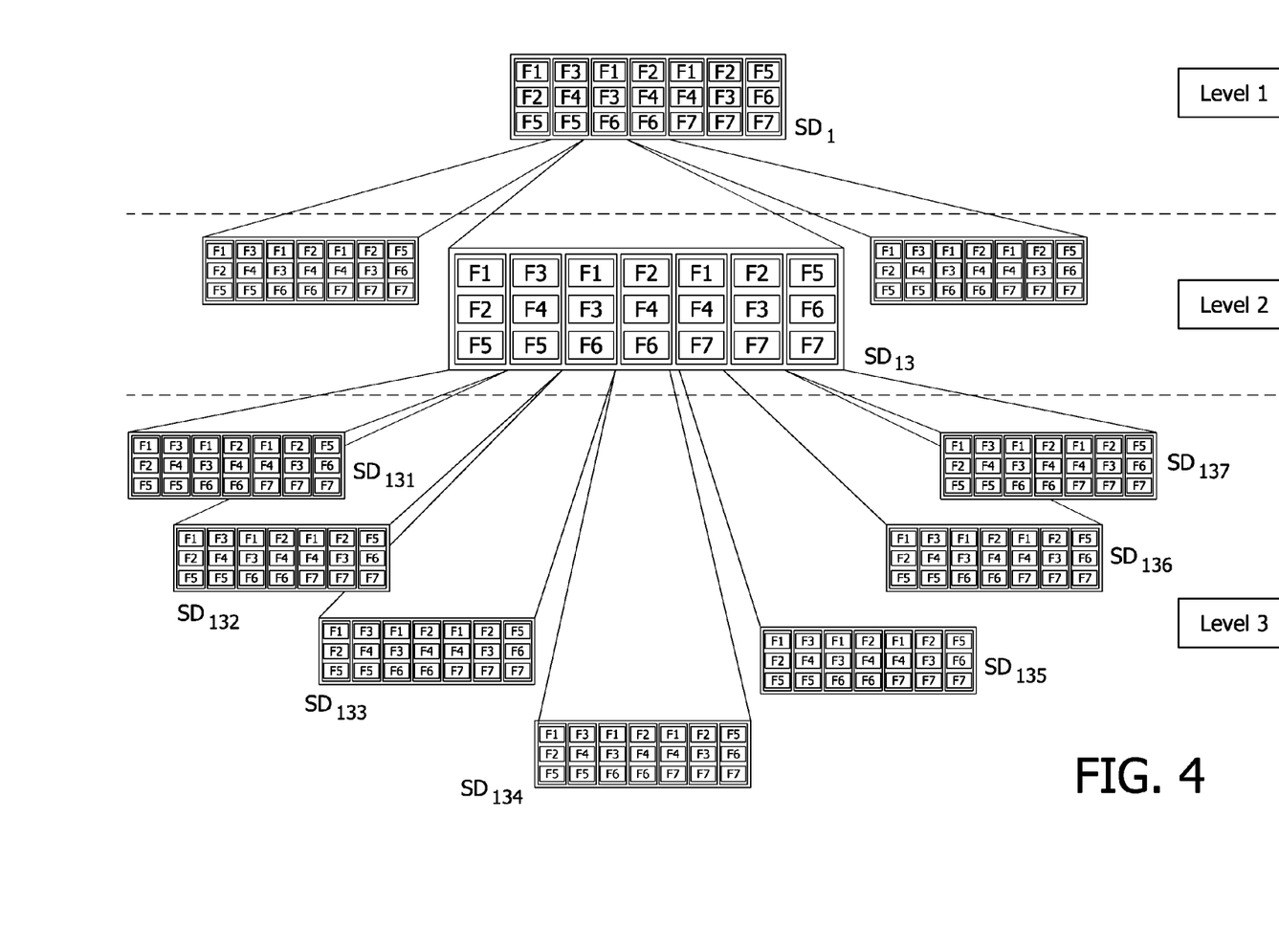
FIG. 4 represents an example of hierarchical key distribution.

Now referring to FIG. 4, we will describe the application of a method according to the invention, with variable distribution and key segmentation, to a system with hierarchical key distribution.

Applying variable node distribution to hierarchical key distribution makes it possible to reduce the amount of compromised keying material among different levels.

Let us assume a simple hierarchical key distribution method with 2 levels. At the first level there is a single security domain, and at the second level there are a total of m different security domains. In a trivial approach, two nodes belonging to different security domains at the second level can get keying material from arbitrary classes at level 1. This means that an attacker aiming at compromising a specific security domain at level 2 can obtain keying material at level 1 from any class. Therefore, the attacker can compromise the whole security domain at level 1 by only capturing nodes from a specific security domain at level 2.

The concept of variable node distribution allows to minimize this problem by assigning the keying material to nodes in variably distributed way. FIG. 4 illustrates this for a single segment or for a hierarchical key distribution without segment diversification. In the figure we can observe a hierarchical distribution with 3 levels where nodes belonging to a security domain (SD) index-i at level l+1 carry keying material generated from $i^{th}$ FPP block of security domain SD index at level 1. For instance, a node belonging to $SD_{134}$ carries keying material:

At level 1 from the $3^{rd}$ FPP block of $SD_1$.
At level 2 from the $4^{th}$ FPP block of $SD_{13}$.
At level 3 from any FPP block of $SD_{134}$.

This system presents several advantages. On the one hand, it allows encoding the SDs the SDs a node belongs to by means of the FPP block identifiers reducing in this manner the communicational overhead. On the other hand, this approach reduces the amount of compromised keying material at a generic level l when an intruder attacks a SD at level l+1 to small fraction of keying material, namely $(n+1)/(n^2+n+1)$, where n is the FPP order of the SD linked to the SD index at level 1. The main drawback of this solution is that the number of SDs index-i at level l+1 that SD index at level l can accommodate is limited to $n^2+n+1$.

Such an approach can also be combined with key segmentation and segment diversification as follows: a node belonging to a SD index-i at level l gets keying material from SD index at level 1 from class i. This increases the number of sub-SDs at level l+1 that a SD at level l can accommodate by a factor $n^2+n+1$. Additionally, if a SD at level l+1 is compromised, the amount of keying material compromised at a higher level is reduced again due to the concept of segment diversification previously described.

A possible inter-level distribution algorithm using the concept of segment diversification can be designed as follows. Nodes at an arbitrary level l get keying material from different security domains SDs according to different variable distribution $C_{jv}$ assigned to security domain. All those nodes get keying material at level l−1 from a number of classes $(n^2+n+1)^2$ in the same security domain. Classes in the security domain at level l−1 are distributed among the security domains at level 1 in such a way that the inter-layer keying materials are randomized so that the capture of a number of nodes in any SD at a level l minimizes the impact on the compromised keying material at level H. Different approaches can be used to this end, for instance Nc classes (e.g., $n^2+n+1$ classes) at level l−1 out of $(n^2+n+1)^2$ possible classes at that level can be assigned to the nodes belonging to a security domain at level 1. The chosen Nc classes (e.g., $n^2+n+1$ classes) at level l−1 can be in a consecutive order, i.e., $\{j, j+1, \ldots, j+Nc\}$ so that a clever distribution can be applied to it.

So as to point out the performances of a system carrying out a method according to the invention, we will now analyze and compare the resiliency of schemes with and without key segment diversification. In this analysis, the composition of keys is defined by concatenation of the key segments and, for fair comparison, a threshold T is introduced for the amount of entropy needed for a key to be sufficiently strong.

The analysis is performed in a case where λ-resilient method is used in combination with a combinatorial pre-distribution concept. The analysis will be performed in a situation where the system is attacked by a clever attacker, i.e. an attacker who does not compromise nodes at random, but chooses the nodes selectively in order to compromise the whole keying material with the less number of captured nodes.

First consider a system without diversification, A clever attacker first selects λ+1 nodes from the same class, thereby compromising n+1 keys. Next he repeatedly selects λ+1 nodes from other classes, each time compromising n more keys, because the classes are chosen cleverly. After n+1 classes, i.e. (λ+1)(n+1) compromised nodes, the attacker knows all the keys in the system. Hence, the fraction of keys that are compromised as function of the number of compromised nodes $N_C$ is as follows:

$$f_{nodiv,clever}(N_C) = \begin{cases} 0 & \text{for } N_C \leq \lambda, \\ \dfrac{n\lfloor N_C/(\lambda+1)\rfloor + 1}{n^2+n+1} & \text{for } \lambda+1 \leq N_C < (\lambda+1)(n+1), \\ 1 & \text{for } N_C \geq (\lambda+1)(n+1). \end{cases}$$

Now in a case with key segment diversification, when a key is composed of $t \geq T/q$ segments, a key is still sufficiently strong after the compromise of $t_r = T/q - t$ key segments. So an adversary needs to gather at least $t_r+1$ segments to break a key. If the total number of nodes $N \geq (\lambda+1)(n^2+n+1)^2$, then a clever attacker can repeatedly compromise λ+1 nodes whose identifiers are equivalent mod $(n^2+n+1)^2$ Hence, with every λ+1 nodes, for every segment a complete FPP block is compromised. Hence, this can be seen as a clever attack on each segment separately. The fraction of compromised keys is defined by the fraction of keys that take at least $t_r+1$ segments from those compromised blocks:

$$f_{div,clever}(N_C, t, t_r) = \sum_{i=t_r+1}^{t} f_{nodiv,clever}(N_C)^i (1 - f_{nodiv,clever}(N_C))^{t-i} \binom{t}{i}.$$

Figure 5:
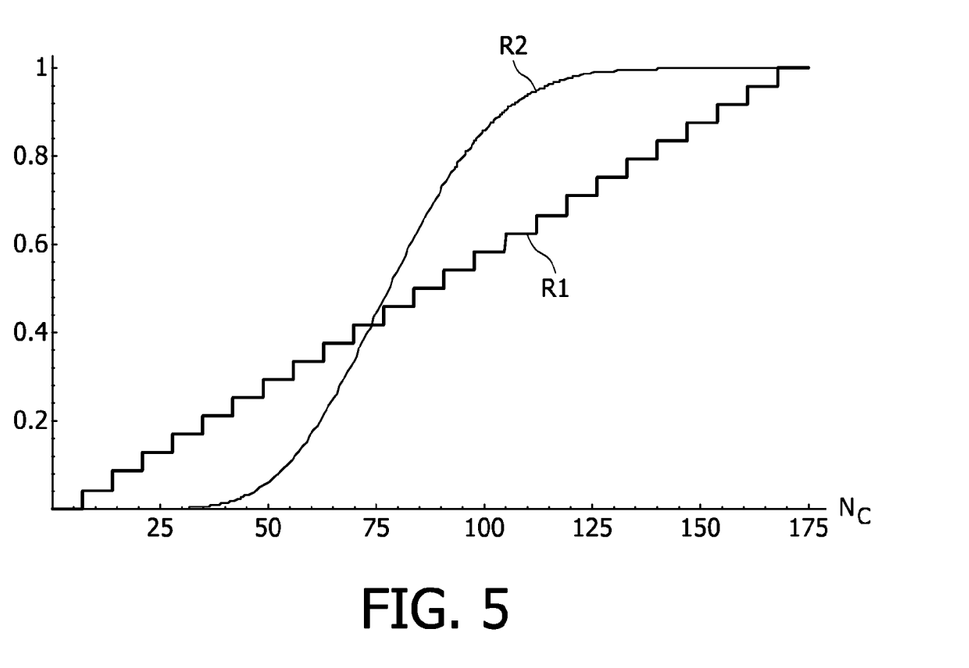
FIG. 5 shows the resiliency against smart attackers of systems with and without key segment diversification.

FIG. 5 plots the resiliency against a clever attacker for the system without diversification for parameters λ=6 and n=23 (R1) and the one with diversification for parameters λ=3 and n=31 (R2). On this figure, the abscissa axis represents the number or captures nodes, and the ordinate axis represents the fractions of compromised nodes. Here the total number of nodes N is assumed to be smaller than 986049. Up to 74 captures nodes, the system with key segment diversification performs better than the one without.

Consequently, it appears that a method according to the invention makes it possible, by use of key segment diversification, to increase the resiliency of security systems carried out in WSNs networks.

Such a method finds a particular application in Zigbee networks as a key feature that improves the security of λ-secure key distribution schemes. More generally, a method according to the invention can also be applied to bootstrap security in resource-constrained wireless nodes used in patient monitoring and distributed wireless control networks.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for secure communications from a first node (N1) to a second node (N2) in a network, the first node having a processing element and comprising a first node keying material ($KM^{(ID1)}$), the second node having a processing element and comprising a second node keying material ($KM^{(ID2)}$), wherein the keying materials of the first and second nodes each comprise a plurality of keying root shares formed by multiple keying root share segments, the method comprising, for the first node, using the processing element of the first node to execute the following steps:
   a) determining an identifier (ID2) of the second node (N2),
   b) determining the composition of the keying material of the second node ($KM^{(ID2)}$), this determination comprising the selection of each $i^{th}$ keying root share segment of the second node keying material from a predistributed keying material set, such set depending at least on i and on the second node's identifier,
   c) comparing the first node keying material ($KM^{(ID1)}$) and the second node keying material ($KM^{(ID2)}$), for identifying the common keying root share segments, wherein an $i^{th}$ common keying root share segment is determined by retrieving the keying root share segment in common between a set comprising the $i^{th}$ keying root share segments generated as elements of an $i^{th}$ Finite Projective Plane of each keying root share of the second node keying material and a set comprising the $i^{th}$ keying root share segments generated as elements of an $i^{th}$ Finite Projective Plane of each keying root share of the first node keying material,
   d) computing a shared key (K) between the first node (N1) and the second node (N2), based on at least one of the identified common keying root share segments, the identifier of the second node (ID2) and the segment identifier i.

2. A method according to claim 1, comprising an initial step, performed before step a), consisting in the first node (N1)) determining the composition of the first node keying material ($KM^{(ID1)}$), wherein the determination comprises the selection of each $i^{th}$ segment of the first node keying material from a predistributed keying material set, such set depending at least on i and on the first node's identifier.

3. A method according to claim 1, further comprising an initial step, performed prior to performing said step (a), of determining, by the first node (N1), the composition of the first node keying material ($KM^{(ID1)}$), wherein the determination of the node keying material is carried out in such a way as to minimize the correlation of the different keying material segments.

4. A method according to claim 3, wherein the network is organized Into different security domains (SDs) hierarchically distributed, and wherein the determination of keying material of the nodes is carried out in such a way that the correlation of keying material shares in different nodes and the amount of compromised keying root shares under attack is minimized.

5. A method according to claim 1, wherein the step (d) of computing a shared key (K) between the first node (N1) and the second node (N2), further comprises:
   computing key segments from the identified keying roots segments, from an identifier of the first node (ID1) and the identifier of the second node (ID2), and
   generating the shared key (K) either by concatenating or combining the computed key segments.

6. A method according to claim 1, wherein the predetermined set of segments used for selecting an $i^{th}$ keying root share segment in step b) is indexed by elements generated as elements of an $i^{th}$ Finite Projective Plane.

7. A method according to claim 4, wherein the predistributed keying material set used for the determination of a node keying material corresponds to a set of elements of finite projective planes distributed according to a variable distribution of the nodes in the network, indexed by a variable parameter, and depending on i and on an identifier of the node whose keying material is being determined.

8. A method according to claim 7 wherein the variable distribution is defined as follows: node ID is assigned to class $C_{j_v}$, where $$j_v \equiv v \cdot \left\lfloor \frac{ID}{n^2+n+1} \right\rfloor + ID \ (\mathrm{mod}\, n^2+n+1),$$

v being the variable parameter, n being the order of a finite projective plane, and $\lfloor x \rfloor$ is the integer part of x.

9. A method according to claim 7, wherein the variable parameter depends on the segment identifier i.

10. A method according to claim 5, comprising performing the following steps prior to performing the step of determining the composition of the keying material of the second node ($KM^{(ID2)}$):
    receiving the values of the variable distribution from a centralized or distributed network authority comprising one or several nodes, said receiving step further comprising:
    sending for the first node (N1), a request to the network authority, for the first node (N1),
    deciding for the network authority whether the first node is allowed to generate a shared key, and in case the node is allowed to generate a shared key,
    sending for the network authority, the values of the variable parameter to the node.

11. A method according to claim 1, wherein keying roots used for deriving said keying root shares are lambda-secure functions.

12. A communication device designed for being included in a network as a first node (N1), the device comprising:
    storage means for storing a keying material of the first node ($KM^{(ID1)}$), the keying material of the first node ($KM^{(ID1)}$) comprising a plurality of keying root shares formed by keying root share segments,
    means for determining an identifier (ID2) of a second node, a controller arranged for determining the composition of the keying material of the second node ($KM^{(ID2)}$), the keying material of the second node comprising a plurality of keying root shares formed by keying root share segments, the controller further comprising determination means comprising selecting means for selecting each $i^{th}$ keying root share segment of the keying material from a predistributed keying material set, such set depending on the segment identifier i and on the second node's identifier, the controller further comprising comparison means for comparing the first node keying material ($KM^{(ID1)}$) and the second node keying material ($KM^{(ID2)}$), for identifying the common keying root share segments, comparison means comprising retrieving means for determining an $i^{th}$ common keying root share segment by retrieving via said retrieving means the keying root share segment in common between a first set comprising the $i^{th}$ keying root share segment of each keying root share of the second node keying material generated as elements of an $i^{th}$ Finite Projective Plane and a second set comprising the $i^{th}$ keying root share segment of each keying root share of a predetermined first node keying material generated as elements of an $i^{th}$ Finite Projective Plane, the controller further comprising computation means for computing a shared key (K) between the first node and the second node, based on at least one of the identified common keying root share segments, the identifier of the second node, and the segment identifier.

13. A network comprising at least two communication devices according to claim 8, wherein one communication device represents a first node (N1) of the network, and another communication device represents a second node (N2) of the network, and wherein the first node and the second node communicate one with each other by using a method according to claim 1.

14. A non-transitory computer program stored on a non-transitory computer readable medium comprising instructions when executed on the non-transitory computer readable medium implements the method according to claim 1.

15. A method according to claim 11, wherein the lambda-secure functions are multivariate polynomials of degree lambda.

* * * * *